No. 758,336. PATENTED APR. 26, 1904.
G. T. SHILTON & A. SCHULTZE.
PNEUMATIC TIRE COVER.
APPLICATION FILED AUG. 25, 1903.
NO MODEL.
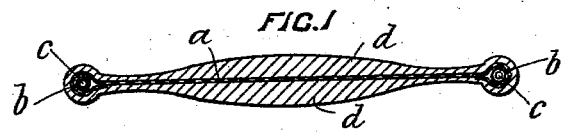
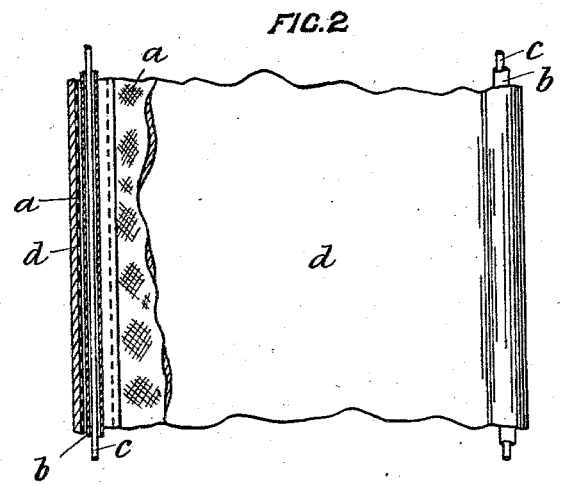
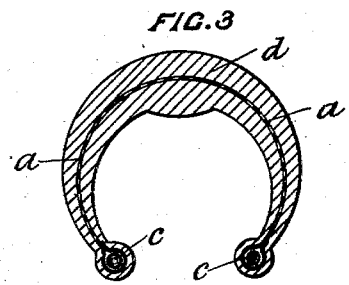
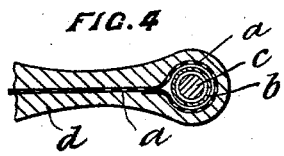

No. 758,336. Patented April 26, 1904.

UNITED STATES PATENT OFFICE.

GEORGE TINNISWOOD SHILTON AND ALBERT SCHULTZE, OF GREYMOUTH, WESTLAND, NEW ZEALAND.

PNEUMATIC-TIRE COVER.

SPECIFICATION forming part of Letters Patent No. 758,336, dated April 26, 1904.

Application filed August 25, 1903. Serial No. 170,662. (No model.)

*To all whom it may concern:*

Be it known that we, GEORGE TINNISWOOD SHILTON and ALBERT SCHULTZE, subjects of the King of Great Britain, residing at Greymouth, Westland, New Zealand, have invented a new and useful Pneumatic-Tire Cover; and we do hereby declare the following to be a full, clear, and exact description of the same.

This invention relates to the outside covers of the pneumatic tires of cycles, motor-cars, and other vehicles, the invention being designed for the purpose of providing a cover that may be reversed, so as to be worn upon both sides thereof. The construction of the cover will moreover insure that it shall be more durable in wear and that it shall afford increased resiliency when running.

The invention also relates to the means whereby the cover may be secured in position upon the rim of the wheel.

The cover is constructed with a base of fabric or canvas, preferably of a large mesh, upon each side of which are placed layers of rubber that are slightly arched in the middle, the whole being then vulcanized together, so as to form one mass, with the fabric or canvas embedded in it. Each of the edges of the canvas or fabric before being thus embedded is secured around a small vulcanized-rubber tube that extends throughout the circumference of the cover and through which an endless wire is loosely threaded. These wires thus pass round throughout the circumference of the cover on both edges and serve to hold the cover in position upon the wheel-rim.

In the accompanying drawings, which illustrate the invention, Figure 1 is a cross-section of the cover flattened out. Fig. 2 is a plan of the same, one edge being shown in section. Fig. 3 is a cross-section of the cover arched into the position it will assume when placed upon a wheel. Fig. 4 is a cross-section, on an enlarged scale, of one edge of the cover.

$a$ is the sheet of canvas or fabric that is made of the full width and length of the cover and the ends of which are joined together, so as to form a circular band. The edges of this canvas band are doubled round and secured upon small tubes $b$ of vulcanized rubber. These tubes extend right throughout the circumference of the cover and loosely inclose endless wires $c$, that also extend throughout the circumference. Rubber strips $d$ are placed on each side of the canvas $a$ and around the edges thereof. The whole of the rubber is then vulcanized together, so as to form one mass, the mesh of the canvas or fabric band thus being thoroughly impregnated with the rubber. The rubber on both sides of the cover is formed with the arches usually formed on the ordinary tire-covers, and bulbed enlargements are formed on the edges. These bulbed enlargements, in conjunction with the wires $c$, will serve to keep the cover in position upon the wheel-rim.

The cover when worn upon one of its faces may be removed and turned over and then replaced upon the wheel. The wires $c$ being loose within the edges of the cover will permit of the cover being readily turned over.

It will thus be seen that the canvas or fabric strip $a$ will be effectively protected from moisture by reason of being hermetically sealed within the rubber and that its strength will consequently be preserved and the cover made less liable to bursting as in the ordinary form of cover. The securing-wires also, by reason of being completely surrounded, will be prevented from corroding, and thereby being weakened.

What we claim as our invention, and desire to secure by Letters Patent, is—

In covers for pneumatic tires, a base of canvas or fabric with wearing-surfaces of rubber on both sides, small tubes of vulcanized rubber secured to both edges of the canvas or fabric and extending throughout the circumference of the cover, and endless wires loosely threaded through the tubes, substantially as specified.

In testimony whereof we have each signed this specification in the presence of two subscribing witnesses.

GEORGE TINNISWOOD SHILTON.
ALBERT SCHULTZE.

Witnesses:
W. ALEXANDER,
M. A. MARCHANT.